United States Patent
Calkins, Jr. et al.

(10) Patent No.: US 8,225,447 B2
(45) Date of Patent: Jul. 24, 2012

(54) DOVETAIL TREATING APPARATUS

(75) Inventors: Dwight F. Calkins, Jr., Rotterdam, NY (US); Steven S. Mounnarat, Penfield, NY (US)

(73) Assignee: General Electric Company, Schenectady, NY (US)

( * ) Notice: Subject to any disclaimer, the term of this patent is extended or adjusted under 35 U.S.C. 154(b) by 608 days.

(21) Appl. No.: 12/484,668

(22) Filed: Jun. 15, 2009

(65) Prior Publication Data

US 2010/0313909 A1 Dec. 16, 2010

(51) Int. Cl.
*B08B 1/04* (2006.01)

(52) U.S. Cl. .......... 15/97.1; 15/21.1; 15/23; 15/28; 15/88.4; 15/230.12; 15/230.14; 15/230.18

(58) Field of Classification Search .......... 15/21.1, 15/23, 28, 88.4, 77, 97.1, 102, 230, 230.12, 15/230.14, 230.15, 230.18, 230.19
See application file for complete search history.

(56) References Cited

U.S. PATENT DOCUMENTS

| | | | | |
|---|---|---|---|---|
| 2,660,009 A * | 11/1953 | Goldberg | | 15/230.19 |
| 3,008,168 A * | 11/1961 | Doyle | | 15/230.15 |
| 3,562,832 A * | 2/1971 | Rickard | | 15/56 |
| 3,578,837 A * | 5/1971 | Brooks | | 359/28 |
| 4,578,837 A * | 4/1986 | Baer | | 15/21.1 |
| 4,799,284 A * | 1/1989 | Toriwaki et al. | | 15/230.12 |
| 5,651,156 A * | 7/1997 | Oomura | | 15/21.1 |
| 6,849,972 B1 | 2/2005 | Barnes et al. | | |
| 7,412,741 B2 | 8/2008 | Roney et al. | | |
| 2006/0083612 A1 | 4/2006 | Roney et al. | | |

* cited by examiner

*Primary Examiner* — Mark Spisich
(74) *Attorney, Agent, or Firm* — James W. Pemrick; Ernest G. Cusick; Frank A. Landgraff

(57) ABSTRACT

An apparatus for treating a dovetail in a dynamoelectric machine is provided. The apparatus includes a housing, at least two pads for treating, cleaning or polishing a dovetail surface, at least a pair of guide wheels for aligning the apparatus within the dovetail, and at least one motor connected to the pads. The motor is operatively configured to rotate the pads. The dovetail surface is treated, cleaned or polished by sliding the apparatus along the dovetail and activating the motor to rotate the pads.

28 Claims, 8 Drawing Sheets

DOVETAIL TREATING APPARATUS

BACKGROUND OF THE INVENTION

The subject matter disclosed herein relates to a method and apparatus for cleaning dovetails. More specifically, the subject matter disclosed herein relates to a method and apparatus for cleaning dovetails in a dynamoelectric machine.

Conventional dynamoelectric machines, such as generators used with gas and steam turbines, typically employ forged rotors of magnetic material into which radial slots are machined for receiving the conductive turns of field windings that are interconnected such as to produce a desired magnetic flux pattern. Typically, included in such conventional rotor slots are creepage blocks at both the top and bottom ends of the slot as well as coil slot wedges for resisting the radially outward forces exerted on the windings when the rotor is operational. Dovetails are typically located at the top of the radial slots, and may be used in conjunction with slides, wedges and ripple springs that aid in retaining the windings within the radial slots.

The slot wedges, which are generally dovetail shaped, are used to maintain the copper coils or windings in place while the rotor is spinning at, for example, 3600 revolutions per minute. During the lifetime of the rotor one or more rewinding operations may be needed. This process entails removing the windings from the radial slots and either repairing, refurbishing or replacing the windings. The dovetail slots at the top of the radial slots also may need to be cleaned or polished, as the material from the slides, wedges and/or ripple springs can adhere to the surfaces of the dovetail. In addition, negative sequence events (e.g., arcs) can cause fretting. One known method for cleaning the dovetail surfaces requires a worker to manually clean or polish the dovetail. However, this process is labor intensive, time consuming and costly.

BRIEF DESCRIPTION OF THE INVENTION

According to an aspect of the present invention, an apparatus for treating a dovetail in a dynamoelectric machine is provided. The apparatus includes a housing, at least two pads for treating, cleaning or polishing a dovetail surface, at least a pair of guide wheels for aligning the apparatus within the dovetail, and at least one motor operatively connected to the pads. The motor is configured to rotate the pads. The dovetail surface is treated by sliding the apparatus along the dovetail and activating the motor to rotate the pads.

According to another aspect of the present invention, a method of treating, cleaning or polishing a dovetail in a dynamoelectric machine is provided. The method includes the steps of providing a powered tool having a plurality of abrasive pads, inserting at least a portion of the powered tool into the dovetail, activating the tool to begin rotation of the abrasive pads, and moving the powered tool along the dovetail to treat the dovetail.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
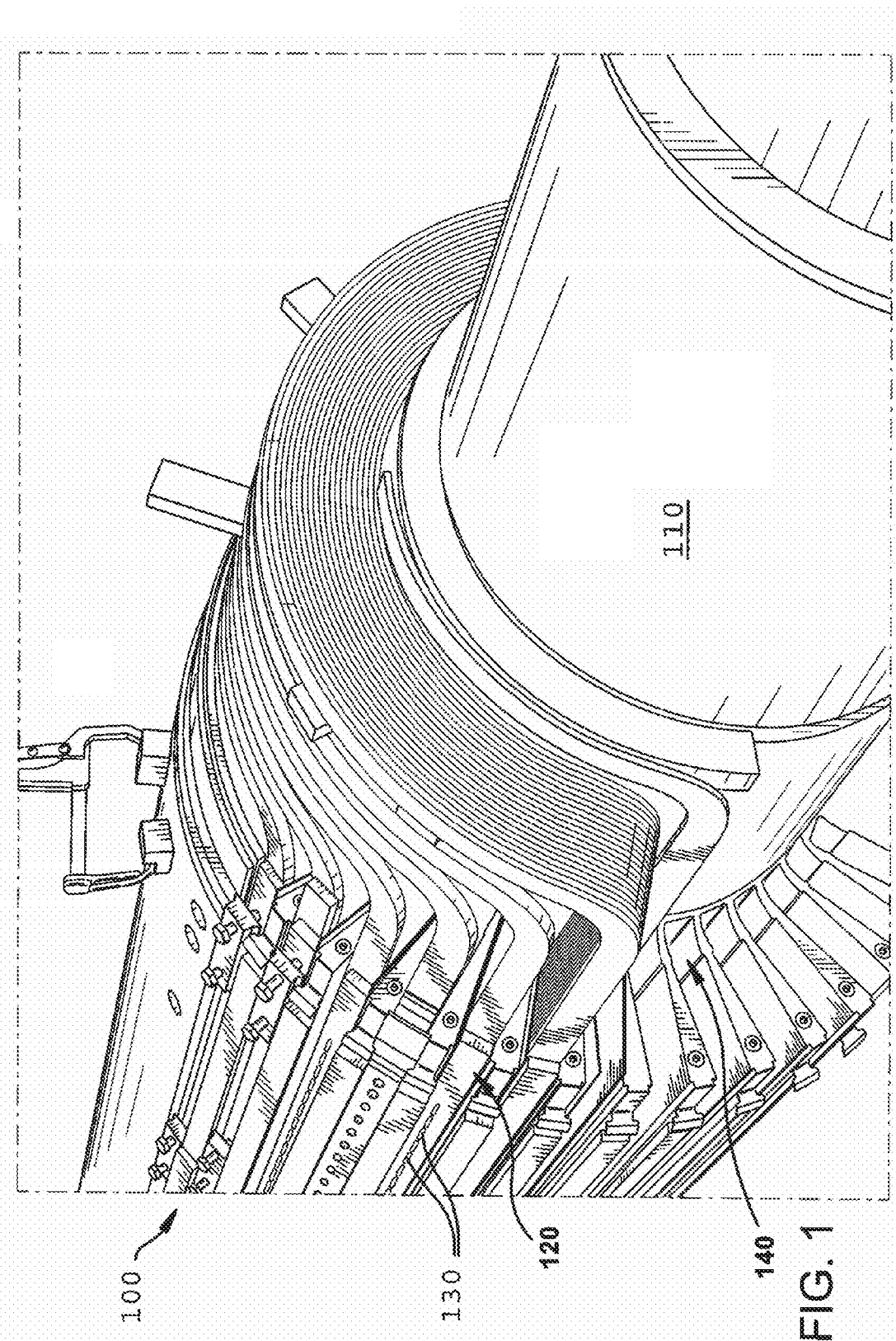
FIG. 1 illustrates a three-dimensional perspective view of a portion of a generator rotor.

FIG. 1 shows a three-dimensional perspective view of a portion of a rotor 100. Rotor 100 may include a spindle 110 and groups of coils (or windings) 120 disposed about spindle 110. Each group of coils 120 may include a plurality of ducts 130. Further, rotor 100 may include a plurality of subslots 140 disposed about spindle 100. Each subslot 140 may extend between spindle 110 and group of coils 120 and may be in fluid communication with group of coils 120.

Figure 2:
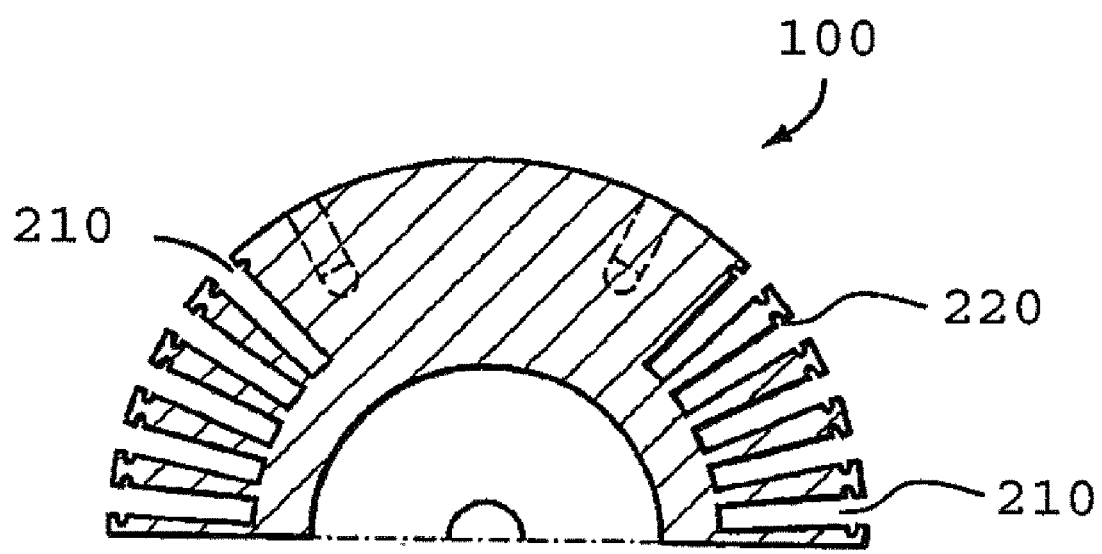
FIG. 2 illustrates a simplified and partial, cross-sectional view of the rotor of FIG. 1.

FIG. 2 illustrates a partial, cross-sectional view of rotor 100. Of particular significance here are the axially oriented coil slots 210 arranged circumferentially about the mid-section of the rotor, that are used for holding the copper field windings or coils 120. The radially outward portion of each slot 210 contains two opposing dovetails 220.

Figure 3:
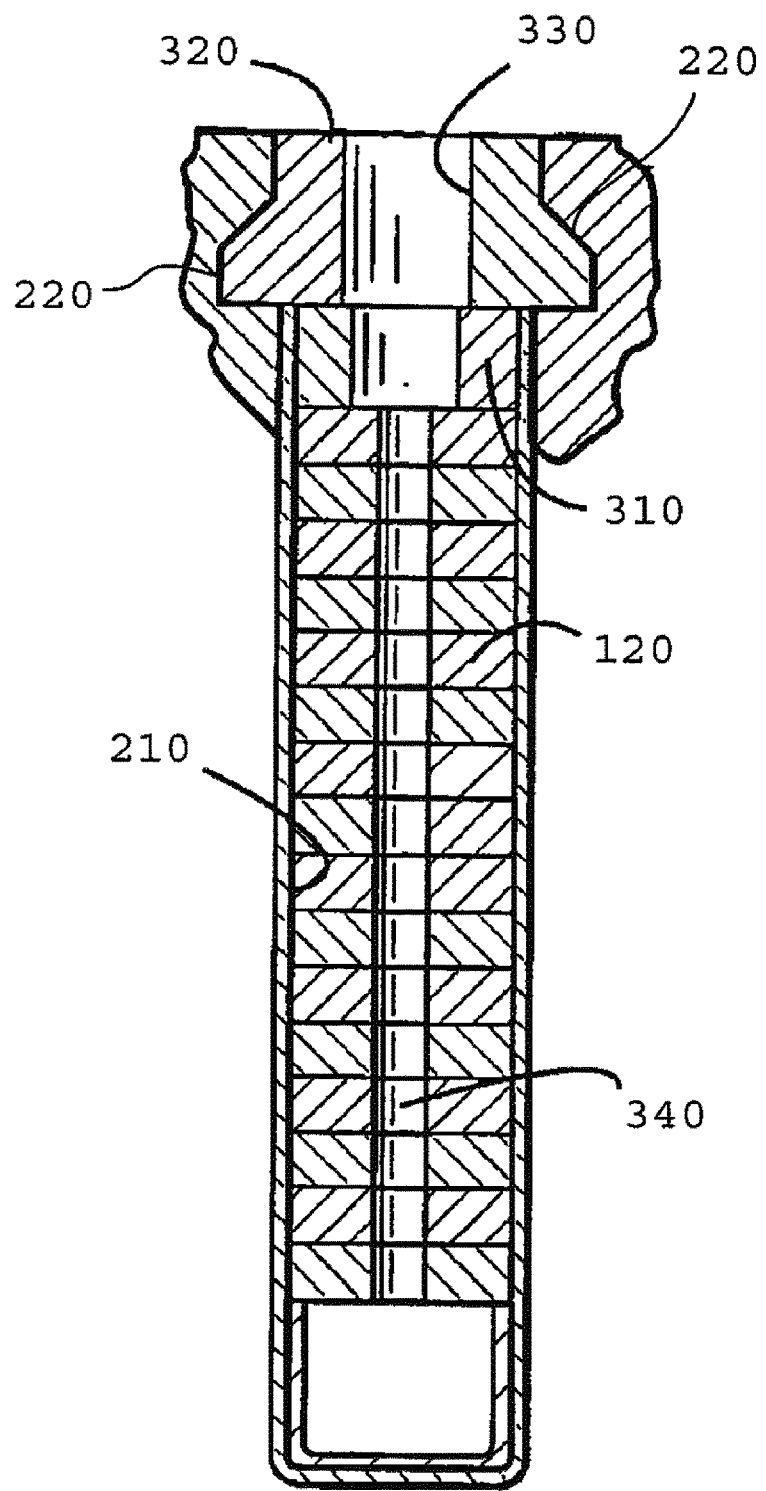
FIG. 3 illustrates a cross-sectional view of a winding in a radial slot.

With further reference to FIG. 3, the coil slots 210 are each radially directed and typically contain, in a radially outward sequence, insulated copper coils 120, a creepage block 310, and a plurality of axially aligned slot wedges 320. The wedges 320 have a generally dovetail shape in cross section, and are located and arranged so as to maintain the copper coils 120 and creepage block 310 in place while the rotor is spinning. The slot wedges 320 may also contain ventilation holes 330 (one shown), which are in general alignment with ventilation channels 340 (one shown), which pass through the copper conductors or coils, as well as through the creepage block 310.

Figure 4:
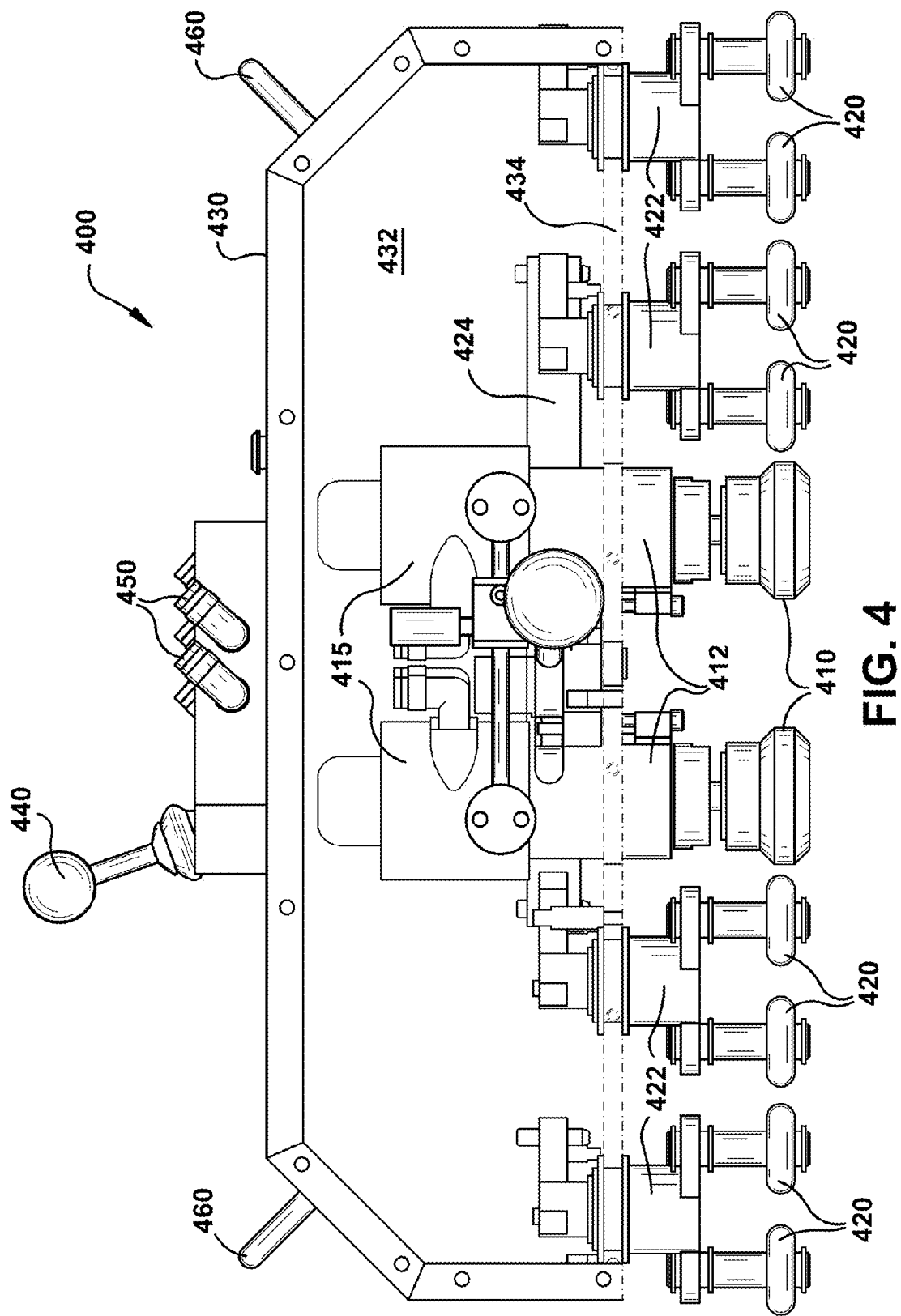
FIG. 4 illustrates a cross-sectional view of a tool used for cleaning and/or polishing the dovetail in a radial slot, according to an aspect of the present invention.

FIG. 4 illustrates a side view of an apparatus 400 that can be used to treat, such as clean or polish, opposing dovetails 220 in a radial slot 210, according to an aspect of the present invention. The apparatus 400 can be positioned on top of slot 210 and slid along a portion or the entire length of the slot, and cleaning pads can be activated to clean the opposing dovetail surfaces.

The apparatus 400 includes two or more cleaning pads 410, which may be formed of an abrasive material. The pads 410 can be formed of steel wool, woven or non-woven polyester fiber or web, woven or non-woven nylon fiber or web, combinations thereof or any other suitable abrasive material, and may be built up of several circular shaped pads having different diameters. Various abrasive particles (e.g., silicon carbide, limestone, etc.) may also be bonded to the material of pads 410. In addition, any material may be added to the pads or dovetail surface to facilitate treating. (e.g., polishing or rubbing compound, cleaning solutions, etc.) Using a plurality of circular shaped pads stacked one upon the other, allows the pad to be designed to have a similar shape to the dovetail surface. The pads 410 can be fit over a rotating shaft connected to motor 415. The motors 415 can be pneumatically (e.g., compressed air, etc.), electrically or battery powered.

Guide wheels 420 are located at the base of the unit and aid in centering the unit in the dovetail 220. The guide wheels may be fabricated of rubber or steel and are mounted on shafts connected to a pivotable shaft 422 connected to bracket 424. The pads 410 are also connected to a pivotable shaft 412 and bracket (not shown in FIG. 4). The apparatus is provided with an enclosure 430 having transparent sides 432 and transparent bottom 434. The transparent bottom and sides permits an operator to monitor the cleaning process. Activation lever 440 can be used to activate the rotation of pads 410. Alternatively, a switch, button or any other suitable activation device can be substituted for lever 440. One or more connectors 450 may be located near the top of the unit for connection of air supply and exhaust hoses. Alternatively, electrical plugs or connections may be provided to connect an electrical power supply. One or more handles 460 may also be provided to facilitate transport and use of the apparatus 400.

Figure 5:
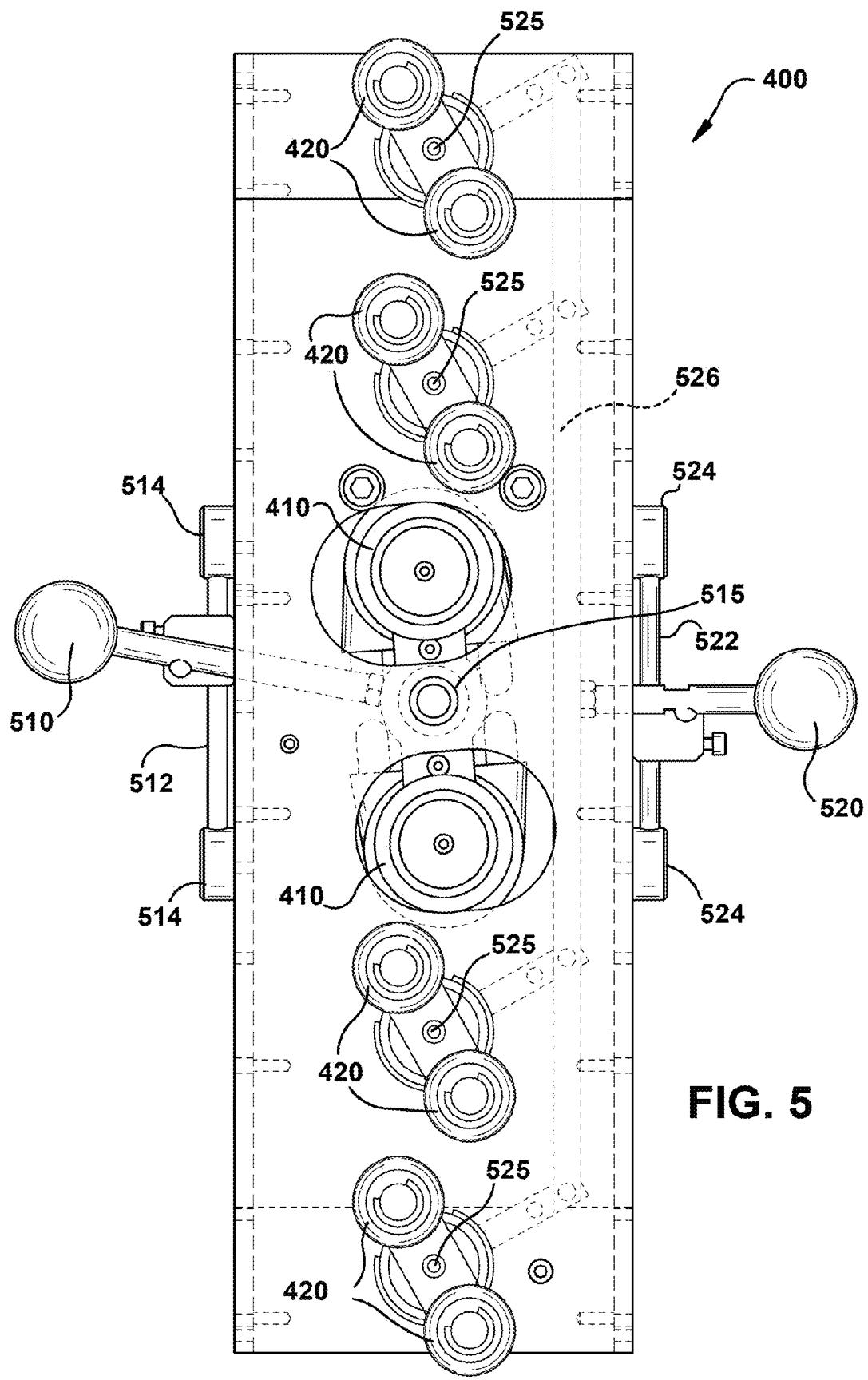
FIG. 5 illustrates a bottom view of a tool used for cleaning and/or polishing the dovetail in a radial slot, according to an aspect of the present invention.

FIG. 5 is a bottom view of the apparatus 400. The pads 410 are connected to a lever 510. The lever can be moved back and forth along slide 512 and between stops 514. Operation of the lever 510 causes the pads 410 to pivot about point 515. As is shown in FIG. 5, the pads 410 are shown near the retracted position. This retracted position enables the pads to be easily placed into dovetail 220. After the pads are positioned in dovetail 220, the lever 510 can be moved to rotate the pads 410 in a counter-clockwise direction around pivot point 515 until they contact the surfaces of dovetail 220.

The guide wheels 420 can be arranged in pairs (as shown) and are connected to lever 520 via bracket 526. Four pairs of guide wheels are shown, however, more or fewer guide wheels may be used as desired in the specific application. The guide wheels are shown near their retracted position, but may be pivoted about pivot points 525 by operation of lever 520. The lever 520 can be moved back and forth along slide 522 and between stops 524. The retracted position enables the guide wheels 420 to be easily placed into dovetail 220. After the guide wheels are positioned in dovetail 220, the lever 520 can be moved to rotate the guide wheels 420 in a counter-clockwise direction around pivot point 525 until they contact the surfaces of dovetail 220.

Figure 6:
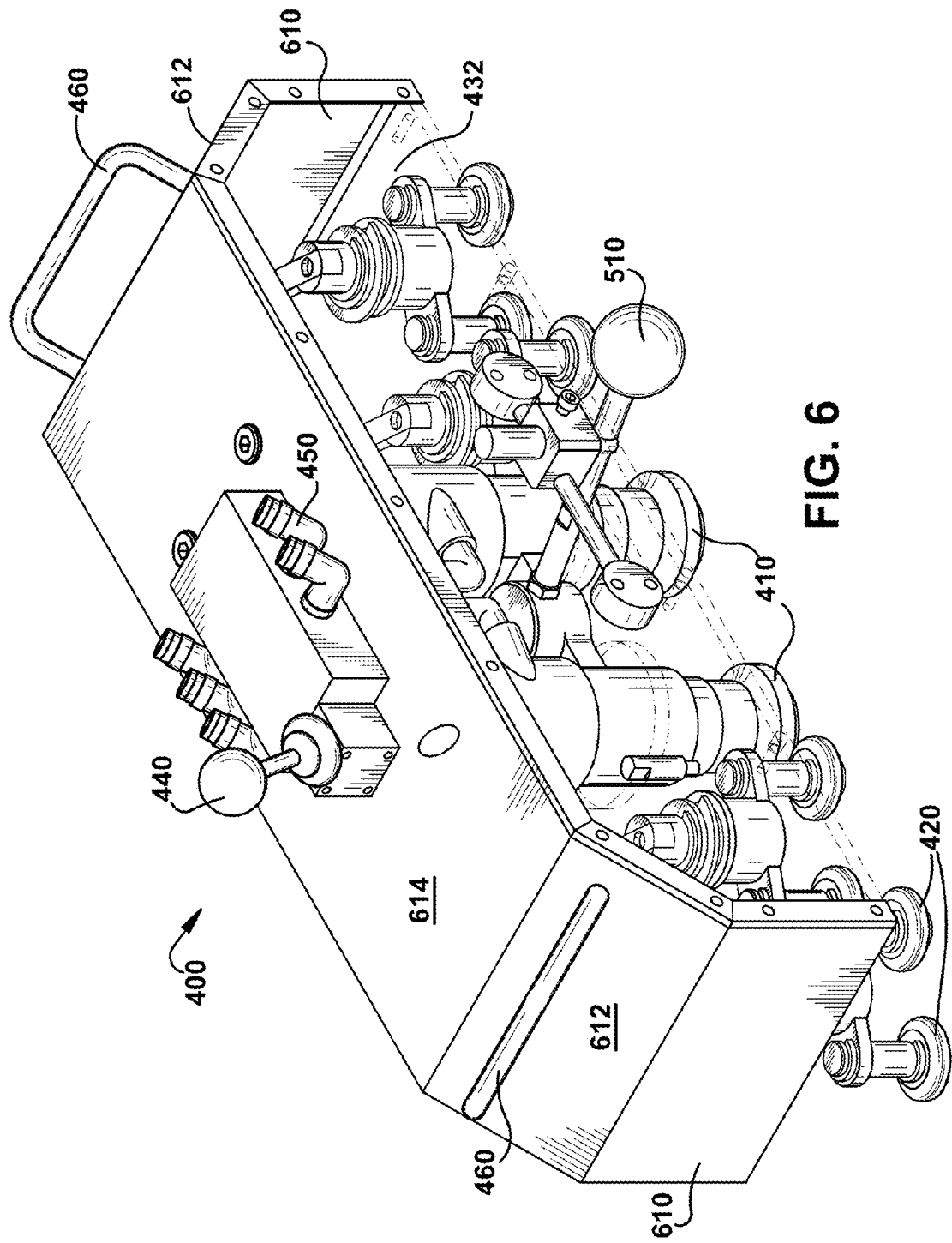
FIG. 6 illustrates a perspective view of a tool used for cleaning and/or polishing the dovetail in a radial slot, according to an aspect of the present invention.

FIG. 6 illustrates a perspective view of the tool or apparatus 400. The housing of the apparatus may include end wall cover 610, tapered cover 612 and top cover 614. These covers may be formed of metal, plastic or any suitable material and may be opaque or transparent. Transparent covers may aid in allowing a worker to monitor the cleaning process. The handles 460 can be attached to tapered cover 612 and/or to end wall cover 610, top cover 614 or sides 432.

Figure 7:
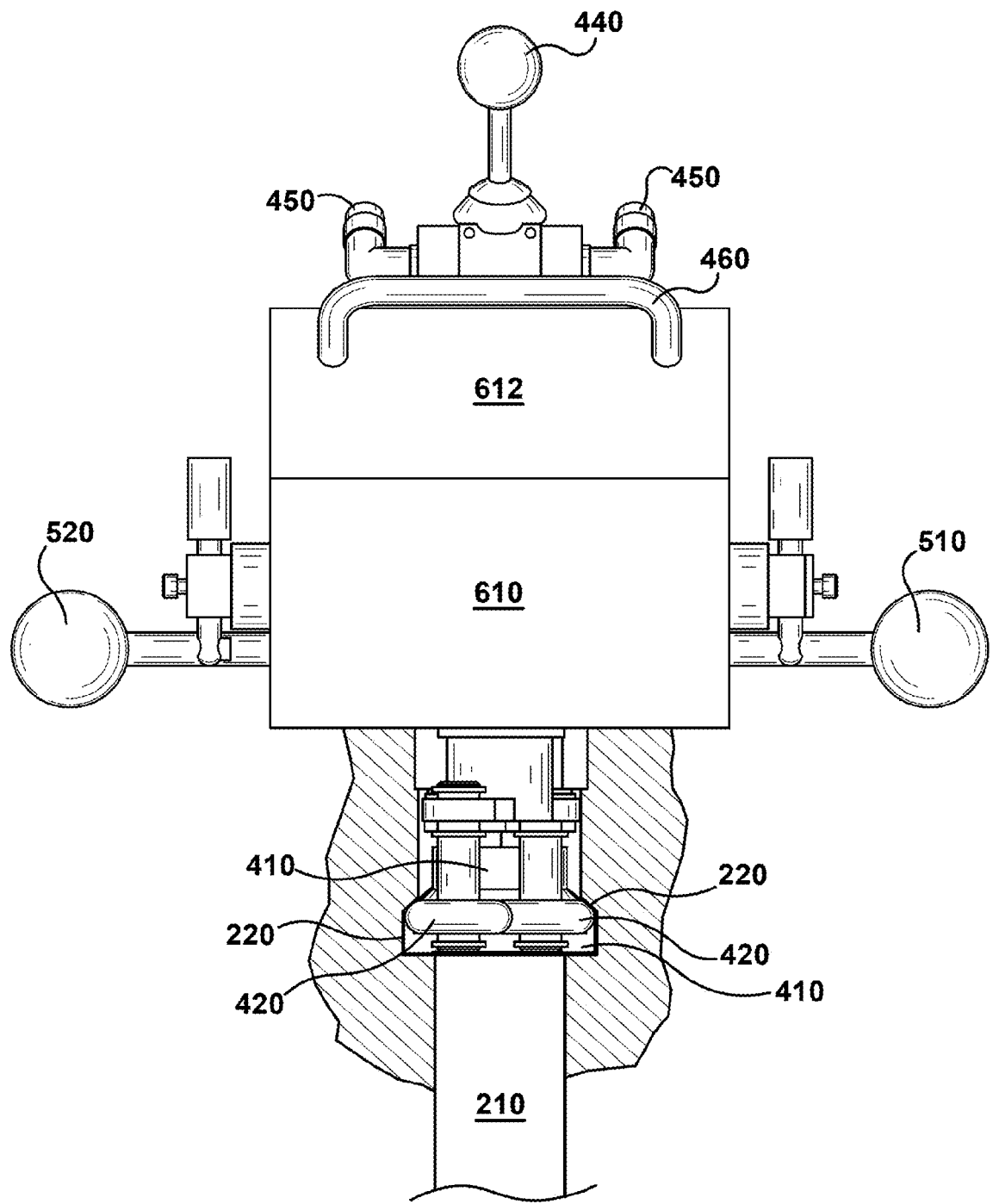
FIG. 7 illustrates the tool of FIGS. 5-6 positioned in a dovetail of a radial slot, according to an aspect of the present invention.

FIG. 7 illustrates the apparatus 400 positioned so that the pads 410 and guide wheels 420 are within dovetail 220 of radial slot 210. During insertion of pads 410, the pads 410 and guide wheels can be retracted to enable ease of insertion. Once the pads have reached the dovetail, the pads and guide wheels can be deployed by moving levers 510 and 520, respectively. The guide wheels center the apparatus within the dovetail and help to maintain alignment of the apparatus during a cleaning process. The pads 410 are formed of a resilient material and at least partially conform to the shape of dovetail 220.

The motors 415 can be energized by activation of switch or lever 440, thereby beginning rotation of pads 410. The rotating pads "scrub" or polish the surface of dovetail 220 and clean off any residual material deposited by creepage block 310 and/or slot wedges 320.

Figure 8:
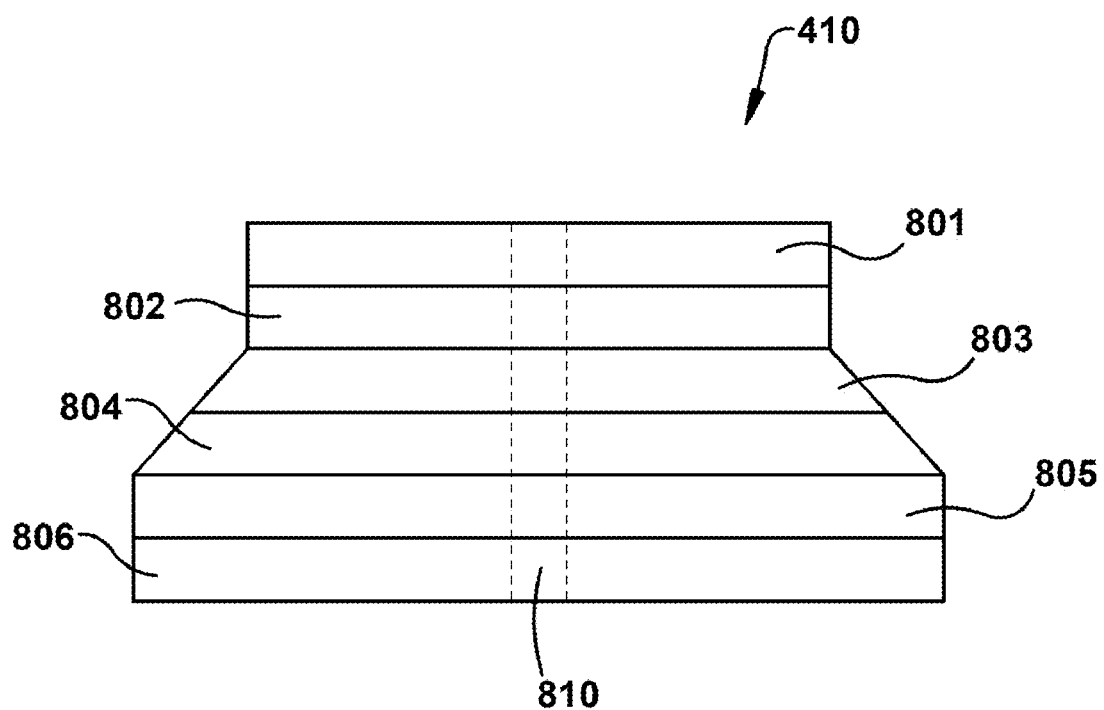
FIG. 8 illustrates a cleaning pad and its construction, according to an aspect of the present invention.

FIG. 8 illustrates the construction of one of the abrasive pads 410, according to one aspect of the present invention. The dovetail 220, may have a variety of shapes, including but not limited to generally "S" shaped, generally "C" shaped, or any other shape that may be used to aid in retaining the windings or coils in a dynamoelectric machine. The dovetail 220, as shown in FIG. 3 may be viewed as having an "S" shape, and the shape of the pad 410 can be constructed to have a similar shape or profile.

Abrasive material is typically available in sheets. The pads 410 can be formed of a stack of cylindrical "punches" of material having a central hole. For example, a plurality of cylindrical discs 801-806 may be punched out of a sheet of abrasive material. A central hole 810 may also be formed in the discs. Each disc can have a diameter that is chosen to conform to the shape of dovetail 220. As shown in FIG. 8, discs 801-802 have a smaller diameter, discs 803 and 804 have increasing diameters, and discs 805-806 have the largest diameters. In this manner, a plurality of discs may be fabricated and stacked together to form a pad having a shape or profile conforming to the shape of the dovetail to be cleaned. The pads 801-806 can be stacked together with or without adhesive to bind them together. The hole 810 is provided to fit over a shaft or spindle of motor 415. The pads can also be designed to be easily replaceable during use. The pads may be machined from semi to rigid material, and these materials may be impregnated with abrasive material, grit or fiber. This type of material can be machined to the dovetail geometry.

A method for cleaning, polishing or treating a dovetail, according to one aspect of the present invention will now be described. The method may include the steps of providing a powered tool having a plurality of abrasive pads and/or guide wheels, inserting at least a portion of the powered tool into a radial slot, activating the tool to begin rotation of the abrasive pads, and moving the powered tool along the slot to clean the dovetail. The inserting step may also include the step of manipulating the abrasive pads and guide wheels into a retracted position, followed by inserting the abrasive pads and guide wheels into the radial slot, and manipulating the abrasive pads and guide wheels into a deployed position so that they contact the surface of the dovetail. One or more levers may be used to manipulate the abrasive pads and guide wheels into and between the retracted and deployed positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for treating a dovetail in a dynamoelectric machine, the apparatus comprising:
   a housing;
   at least two pads for treating a surface of said dovetail, wherein the at least two pads are connected and configured to pivot about a pivot point located about midway between the at least two pads;

at least a pair of guide wheels for aligning the apparatus within the dovetail;

at least one motor operatively connected to said at least two pads, said motor for rotating said at least two pads;

wherein, a surface of said dovetail can be treated by sliding said apparatus along said dovetail and activating said at least one motor to rotate said pads.

2. The apparatus of claim 1, wherein said at least two pads are formed of an abrasive material chosen from at least one, or combinations, of the group comprising:

steel wool, woven polyester fiber, non-woven polyester fiber, woven polyester web, non-woven polyester web, woven nylon fiber, non-woven nylon fiber, woven nylon fiber, and non-woven nylon web.

3. The apparatus of claim 2, wherein the at least two pads comprise a stack of a plurality of substantially cylindrical discs, a diameter of said plurality of substantially cylindrical discs configured to substantially conform to said dovetail.

4. The apparatus of claim 1, wherein an actuator is connected to said pivot point, said actuator for rotating said at least two pads around said pivot point.

5. The apparatus of claim 4, wherein the at least two pads can be positioned in a retracted position that facilitates insertion of said at least two pads into said dovetail.

6. The apparatus of claim 5, wherein the at least two pads can be positioned in a deployed position that enables said at least two pads to contact a surface of said dovetail.

7. The apparatus of claim 1, wherein the at least a pair of guide wheels are connected and configured to pivot about a pivot point located about midway between the at least a pair of guide wheels.

8. The apparatus of claim 7, wherein an actuator is connected to said pivot point, said actuator for rotating said guide wheels around said pivot point.

9. The apparatus of claim 8, wherein the at least a pair of guide wheels can be positioned in a retracted position that facilitates insertion of said at least a pair of guide wheels into said dovetail, and positioned in a deployed position that enables the at least a pair of guide wheels to contact a surface of said dovetail.

10. The apparatus of claim 1, wherein the treating comprises at least one of cleaning and polishing.

11. The apparatus of claim 1, wherein the at least one motor is chosen from the group comprising of:

a pneumatic motor, an electrical motor, and a battery powered motor.

12. The apparatus of claim 11, wherein the at least one motor comprises a pneumatic motor that is powered by compressed air.

13. The apparatus of claim 1, wherein the housing comprises one or more transparent portions.

14. The apparatus of claim 13, wherein at least one side and a bottom of said housing are fabricated from a transparent material.

15. An apparatus for treating a dovetail in a machine, the apparatus comprising:

a housing;

at least two pads for treating a surface of the dovetail;

at least a pair of guide wheels for aligning the apparatus within the dovetail, the at least a pair of guide wheels connected and configured to pivot about a pivot point located about midway between the at least a pair of guide wheels;

at least one motor operatively connected to the at least two pads, the motor for rotating the at least two pads;

wherein, a surface of the dovetail can be treated by sliding the apparatus along the dovetail and activating the at least one motor to rotate the pads.

16. The apparatus of claim 15, wherein the at least two pads are formed of an abrasive material chosen from at least one, or combinations, of the group comprising:

steel wool, woven polyester fiber, non-woven polyester fiber, woven polyester web, non-woven polyester web, woven nylon fiber, non-woven nylon fiber, woven nylon fiber, and non-woven nylon web.

17. The apparatus of claim 16, wherein the at least two pads comprise a stack of a plurality of substantially cylindrical discs, a diameter of the plurality of substantially cylindrical discs configured to substantially conform to the dovetail.

18. The apparatus of claim 15, wherein the at least two pads are connected and configured to pivot about a pivot point located about midway between the at least two pads.

19. The apparatus of claim 18, wherein an actuator is connected to the pivot point, the actuator for rotating the at least two pads around the pivot point.

20. The apparatus of claim 19, wherein the at least two pads can be positioned in a retracted position that facilitates insertion of the at least two pads into the dovetail.

21. The apparatus of claim 20, wherein the at least two pads can be positioned in a deployed position that enables the at least two pads to contact a surface of the dovetail.

22. The apparatus of claim 15, wherein an actuator is connected to the pivot point, the actuator for rotating the guide wheels around the pivot point.

23. The apparatus of claim 22, wherein the at least a pair of guide wheels can be positioned in a retracted position that facilitates insertion of the at least a pair of guide wheels into the dovetail, and positioned in a deployed position that enables the at least a pair of guide wheels to contact a surface of the dovetail.

24. The apparatus of claim 15, wherein the treating comprises at least one of cleaning and polishing.

25. The apparatus of claim 15, wherein the at least one motor is chosen from the group comprising of:

a pneumatic motor, an electrical motor, and a battery powered motor.

26. The apparatus of claim 25, wherein the at least one motor comprises a pneumatic motor that is powered by compressed air.

27. The apparatus of claim 15, wherein the housing comprises one or more transparent portions.

28. The apparatus of claim 27, wherein at least one side and a bottom of the housing are fabricated from a transparent material.

\* \* \* \* \*